United States Patent [19]
Atkins et al.

[11] Patent Number: 5,768,452
[45] Date of Patent: Jun. 16, 1998

[54] RADIOLYTIC METHOD FOR TRIMMING PLANAR WAVEGUIDE COUPLERS

[75] Inventors: Robert Michael Atkins, Millington; Benjamin Irvin Greene, Westfield; Chellappan Narayanan, North Plainfield; Herman Melvin Presby, Highland Park, all of N.J.

[73] Assignee: Lucent Technologies Inc., Murray Hill, N.J.

[21] Appl. No.: 633,610

[22] Filed: Apr. 17, 1996

[51] Int. Cl.[6] .................................................. G02B 6/26
[52] U.S. Cl. .................................................. 385/27
[58] Field of Search .................. 385/27, 31, 37, 385/50, 51

[56] References Cited

U.S. PATENT DOCUMENTS

| | | | |
|---|---|---|---|
| 5,117,470 | 5/1992 | Inoue et al. | 385/14 |
| 5,416,863 | 5/1995 | Vengsarkar | 385/28 |
| 5,550,940 | 8/1996 | Vengsarkar et al. | 385/50 X |
| 5,652,819 | 7/1997 | Orazi | 385/51 |

OTHER PUBLICATIONS

"Tapered–Beam Expander for Single–Mode Optical–Fibre Gap Devices". K.P. Jedrzejewski et al., Electronics Letters Jan. 16, 1986, vol. 22, No. 2 pp. 105, 106.

"Optical Fiber Tapers–A Novel Approach to Self–Aligned Beam Expansion and Single–Mode Hardware", N. Amitay et al, Jour. of Lightwave Tech., vol. LT–5, No. 1, Jan. 1987, pp. 70–76.

"Laser–Trimmed Four–Post Bandpass Filter Fabricated in Single–Mode Photosensitive Ge–Doped Planar Waveguide", R. Kashyap et al., IEEE Photonics Technology Letters, vol. 5, No. 2, Feb. 1993, pp. 191–194.

"Increase in Photosensitivity in Silica–Based Optical Waveguides on Silicon", Y. Hibino et al., Electronics Letters, Apr. 1, 1993, vol. 29, No. 7, pp. 621–623.

"Mechanisms of Enhanced UV Photosensitivity Via Hydrogen Loading in Germanosilicate Glasses", R. M. Atkins et al., Electronics Letters, vol. 29, No. 14, Jul. 8, 1993, pp. 1234–1235.

"Low–Loss (–0.15dB) Arc Fusion Splicing of Erbium–Doped Fibers With High Strength (~400 ksi) for Highly Reliable Optical Amplifier Systems", S. G. Kosinski et al., Optical Fiber Communication Conference, Feb. 2–7, 1992.

*Primary Examiner*—Akm E. Ullah
*Attorney, Agent, or Firm*—Steven R. Bartholomew; Brian K. Dinicola; Stuart Mayer

[57] ABSTRACT

A method is provided of trimming the optical coupling ratio of an optical coupler to a prescribed value. The optical coupler is formed from a plurality of waveguides which each include a core and cladding. In accordance with the method, an irradiation energy is selected that is absorbed by portions of the waveguides located in a coupling region. A dosage of radiation is applied to the waveguide portions at least sufficient to adjust the optical coupling ratio to the prescribed value. The radiation, which may be absorbed by the cladding and/or the core of the waveguides, causes a change in the refractive index difference between the core and cladding of the waveguides. This change in the refractive index difference will result in a change in the optical coupling ratio of the device.

22 Claims, 2 Drawing Sheets

RADIOLYTIC METHOD FOR TRIMMING PLANAR WAVEGUIDE COUPLERS

FIELD OF THE INVENTION

This invention relates to planar waveguide couplers and, in particular, to a method for trimming the optical coupling ratio of a planar waveguide coupler.

BACKGROUND OF THE INVENTION

In order to promote commercial communication using optical fiber transmission technologies, various kinds of optical devices must be developed in addition to optical fibers, light emitting devices, and light receiving devices. Among these optical devices, an optical coupler is required for a variety of reasons, including the extraction of information from optical fibers. Furthermore, optical couplers are frequently key "building blocks" in components which either combine or separate individual wavelength channels.

An optical coupler has two or more waveguides arranged adjacent to and closely separated from one another. An optical coupler splits lightwaves coherently in a manner similar to a beam splitter in bulk optics. The evanescent tail of the lightwave in one waveguide extends to the neighboring waveguide and induces electric polarization. The polarization generates a lightwave in the second waveguide which also couples back to the first waveguide in a well known manner. The strength of coupling between the two waveguides is proportional to the coupling coefficient of the optical coupler. For a waveguide coupler, the fraction of the light coupled from the first waveguide to the second waveguide is known as the coupling ratio.

Many optical devices that incorporate optical couplers require precise coupling ratios at a particular design wavelength (e.g., 50/50 at a wavelength of 1.5 microns). The coupling ratio is dependent on a number of factors, including the refractive indices of the core and cladding of the waveguides and the separation between waveguides. However, one limitation in the fabrication of optical couplers having coupling ratios that are precisely specified is that process control of the refractive indices of the cladding and core is often not sufficient to result in high yields for designs having such precise requirements.

Methods are known for varying the refractive index of a waveguide by irradiation to trim the effective path length of the arms in a Mach-Zehnder interferometer (see M. Kawachi, N. Takato, K. Jinguji and A. Sugita, Proceeding of CLEO 1989, Baltimore, TUJ1F; R. Kashyap, G. D. Maxwell, and B. J. Ainslie, IEEE Photonics Technology Letts, 5, 191–193 (1993)). However, there is no known method in which an irradiation step is performed to modify the coupling ratio in a planar waveguide coupler. Accordingly, it would be advantageous to develop a method of fabricating an optical coupler in which an irradiation step is employed to specify the coupling ratio to a sufficiently precise value.

SUMMARY OF THE INVENTION

The present invention provides a method of trimming the optical coupling ratio of an optical coupler to a prescribed value. The optical coupler is formed from a plurality of waveguides which each include a core and cladding. In accordance with the method, an irradiation energy is selected that is absorbed by portions of the waveguides located in a coupling region. A dosage of radiation is applied to the waveguide portions which is at least sufficient to adjust the optical coupling ratio to the prescribed value. The radiation, which may be absorbed by the cladding and/or the core of the waveguides, causes a change in the refractive index difference between the core and cladding of the waveguides. This change in the refractive index difference results in a change in the optical coupling ratio of the device

DETAILED DESCRIPTION

Figure 1:
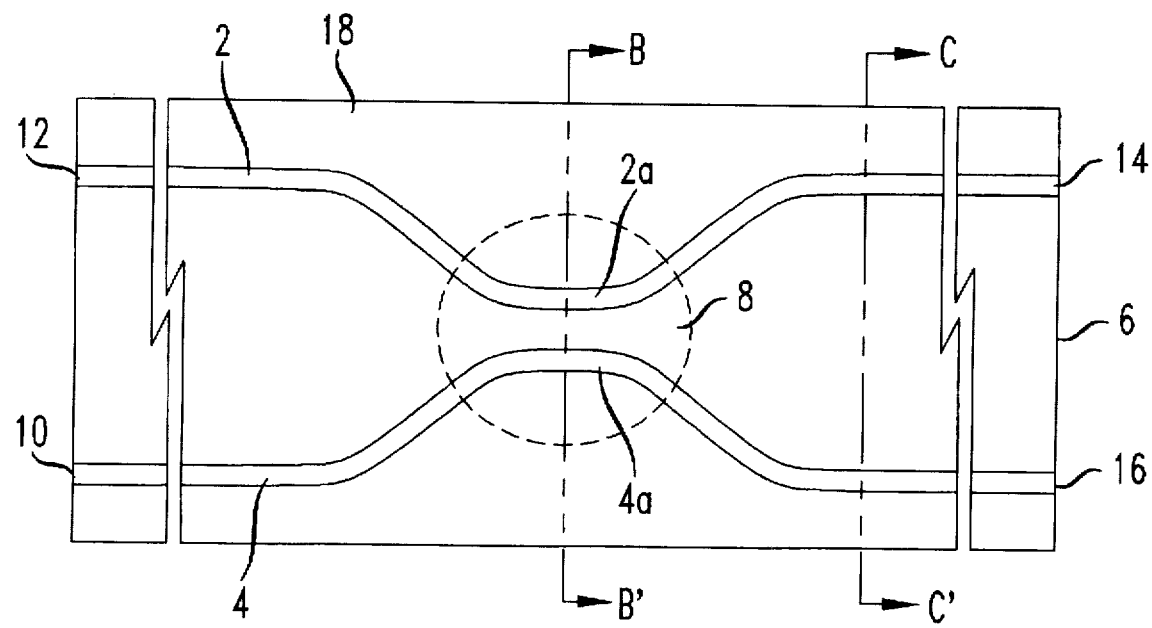
FIG. 1 shows an embodiment of an optical coupler formed in accordance with the present invention.
Figure 2:
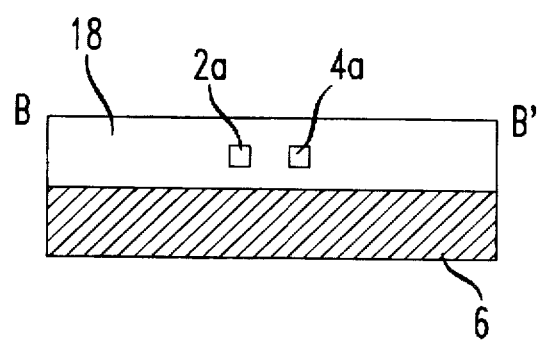
FIG. 2 shows a cross-sectional view of the coupler shown in FIG. 1

FIG. 1 shows an illustrative embodiment of an optical coupler formed in accordance with the present invention. Two optical waveguides 2 and 4 are placed on a planar substrate 6 in accordance with well known fabrication techniques. A directional coupling portion 8 is formed by arranging portions 2a and 4a of the optical waveguides 2 and 4 in close proximity to each other. Components 10 and 12 are input ports of the optical waveguides 4 and 2, respectively, and components 16 and 14 are output ports of the optical waveguides 4 and 2, respectively. In FIG. 2, which shows a cross-sectional view of the coupler shown in FIG. 1, cores of the optical waveguides 2 and 4 are buried in a cladding layer 18 arranged on the substrate 6.

It is well known in the art that the coupling coefficient of an optical coupler is a function of both the separation between the waveguides 2 and 4 in the coupling portion 8 and the refractive indices of the core and cladding of the waveguides 2 and 4. More particularly, the coupling coefficient in a waveguide coupler is dependent on the normalized refractive index difference between the core and cladding. This quantity is frequently referred to as "delta" ($\Delta$). The larger the value of delta, the more tightly confined to the core will be the spatial profile of the guided light. Conversely, lower values of delta result in an increasing fraction of the guided light being contained outside the core in the evanescent tail. Consequently, as delta decreases, the distance from the core over which the evanescent tail projects becomes greater. If the distance between two waveguides remains fixed, a decrease in delta will increase the interaction between the two waveguides. For any particular wavelength of guided light, therefore, the characteristic coupling length (the length for which there is total transfer of the light form one waveguide to the other) will decrease when delta decreases. As previously noted, optical couplers are often required which have precise coupling ratios at a particular design wavelength. Conventional fabrication methods for controlling the value of delta are often not sufficient to result in high yields for designs having such precise requirements.

Figure 3:
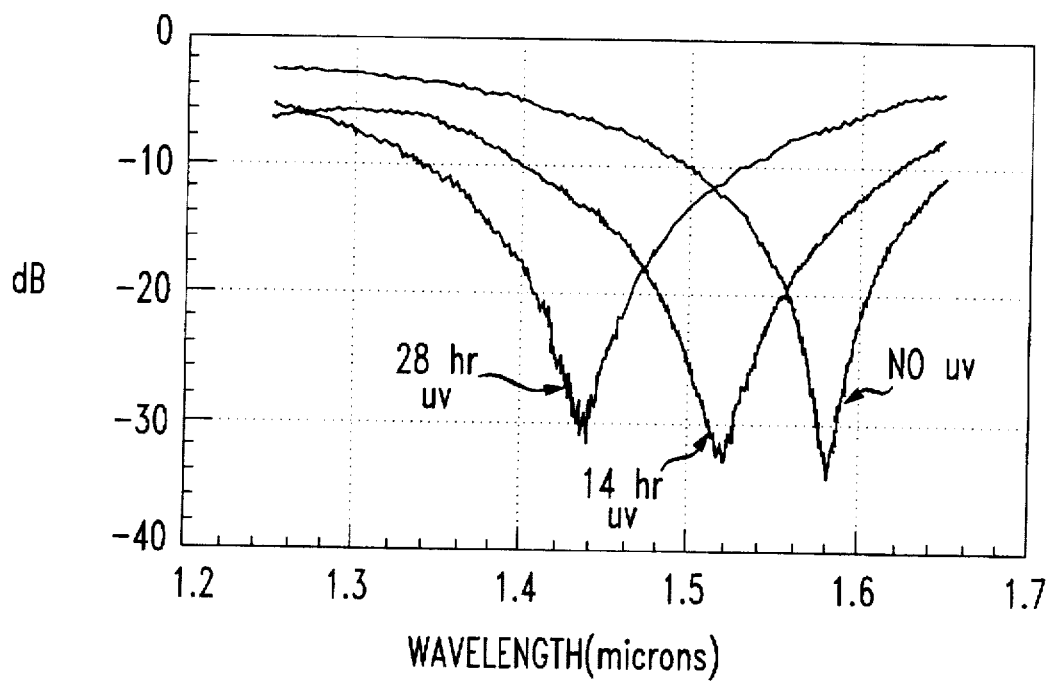
FIG. 3 shows the spectral transmission of an optical coupler before irradiation, after 14 hours of irradiation, and after 28 hours of irradiation, respectively.

FIG. 3 shows how irradiation of the coupling portion of an optical coupler in accordance with the present invention causes changes in the coupling parameters of the device. The coupler devices from which this data was obtained were fabricated with a 4% phosphorous doped core and a 4% boron and 2.5% phosphorous doped cladding. The coupler region was illuminated with UV light at 172 nm from an excimer lamp. FIG. 3 shows the spectral transmission of the device measured at output port 14 (see FIG. 1) after introduction of light at input port 12. This configuration is frequently referred to as the device's "bar" state. The device had been annealed in oxygen at 900° C. prior to UV exposure to facilitate transmission of the light through the cladding. The three traces in FIG. 3 show the transmission through the device before irradiation, after 14 hours of irradiation, and after 28 hours of irradiation. The wavelength of minimum transmission occurs when light introduced at input port 12 is most completely coupled into the other waveguide and emerges from output port 16. FIG. 3 shows that the wavelength of minimum bar-state transmission shifts to lower wavelengths upon irradiation. This result is consistent with increased interaction between the two waveguides due to a radiolytically induced decrease in delta. The decrease in delta occurs because the refractive index in the cladding increases more than the refractive index in the core upon irradiation.

Based on the data shown in FIG. 3, in accordance with the present invention, the coupling ratio of an optical coupler may be modified or trimmed by irradiating the coupling portion of the optical coupler in a post-fabrication step. That is, the coupler is first fabricated in accordance with any known technique so that its coupling ratio is as close to the desired value as is feasible. Next, the coupling ratio is trimmed in accordance with the present invention so that the desired value is obtained with sufficient precision.

The trimming of the coupling ratio may be accomplished by altering the refractive indices of the cladding (or, alternatively, the cladding and core) of the coupling portions of the waveguides by irradiating the waveguides at a specific wavelength in accordance with the technique disclosed in U.S. application Ser. Nos. 08/396,023 and 08/396,031. As disclosed in these pending applications, the specific wavelength that is selected must undergo electronic absorption in either the cladding or both the cladding and core. The layer or layers absorbing the radiation will undergo a change in refractive index. For a given dosage of radiation, the refractive index of the cladding increases more rapidly than the refractive index of the core.

Beyond these conditions disclosed in the previously mentioned applications, however, to adequately trim the coupling ratio, the wavelength of light also may be chosen to be predominantly absorbed in the core. For example, using light at a wavelength of 247 nm and a germanosilicate-doped waveguide core will result in the modification of the coupling coefficient and coupling ratio. However, other appropriate wavelengths can be determined by any technique desired, including an empirical technique in which various wavelengths are used and the resulting change in the coupling coefficient (or, alternatively, the refractive indices or delta) is measured. Appropriate radiation dosages will depend on the degree to which the refractive index must be changed to achieve the desired coupling coefficient.

The inventive optical coupler may be stabilized so that the induced change in refractive index, and hence the value of the coupling coefficient, does not undergo substantial decay over time. As discussed in co-pending application Ser. No. 08/396,023, such stabilization may be achieved by thermally annealing the coupler after exposing it to radiation.

Figure 4:
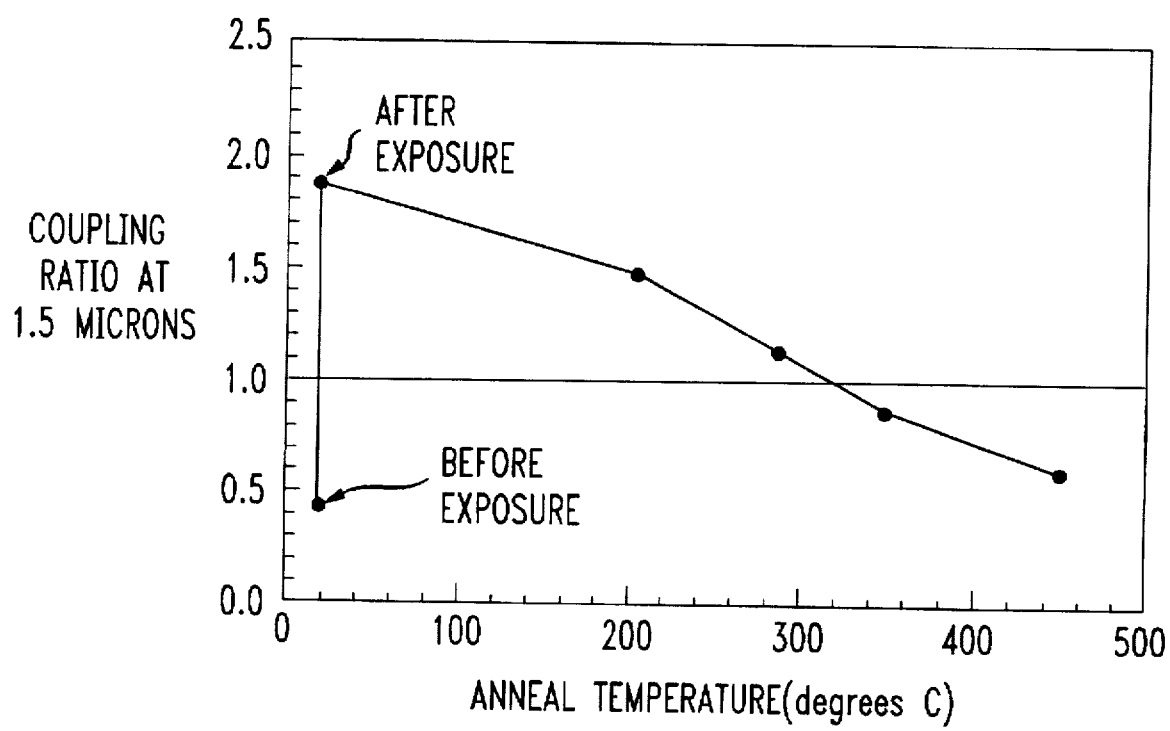
FIG. 4 shows the coupling ratio of an optical coupler operating at a wavelength of 1.5 microns before irradiation, after irradiation and during the course of subsequent thermal annealing.

FIG. 4 shows the coupling ratio of an optical coupler operating at a wavelength of 1.5 microns before irradiation, after irradiation and during the course of subsequent thermal annealing. The coupling ratio as defined for the purposes of FIG. 4 is the ratio of optical power at output port 16 to that at output port 14 (see FIG. 1), after introduction of light at input port 12. As FIG. 4 clearly shows, the coupling ratio in such a device is increased by UV illumination of the coupling region. Furthermore, it is possible to subsequently anneal back the device to decrease the coupling ratio. This annealing step may be terminated at any desired point to achieve a precise coupling ratio.

We claim:

1. A method of trimming the optical coupling ratio of an optical coupler to fall within a prescribed tolerance of a desired value at a given wavelength, said coupler having a plurality of waveguides each formed from a core and cladding, said method comprising the steps of:

selecting an irradiation energy that is absorbed by portions of the waveguides located in a coupling region;

applying a dosage of radiation at said irradiation energy to said waveguide portions at least sufficient to adjust the optical coupling ratio to fall within the prescribed tolerance of the desired value; and annealing the optical coupler.

2. The method of claim 1 wherein said irradiation energy is at least absorbed by the cladding of the waveguides.

3. The method of claim 2 wherein said irradiation energy is also absorbed by the core of the waveguides.

4. The method of claim 1 wherein said irradiation energy is substantially absorbed by the core of the waveguides.

5. The method of claim 1 wherein said irradiation energy corresponds to ultraviolet radiation.

6. The method of claim 5 wherein the cores of said waveguides are composed of phosphorous-doped silica.

7. The method of claim 6 further comprising the step of annealing the optical coupler in oxygen prior to the step of applying the dosage of radiation.

8. The method of claim 1 wherein the cores of said waveguides are composed of germanium-doped silica.

9. The method of claim 8 wherein said irradiation energy has a wavelength of approximately 247 nm.

10. The method of claim 1 further comprising the step of annealing the optical coupler subsequent to the step of applying radiation.

11. The method of claim 10 wherein said annealing step is performed for a time period sufficient to adjust the optical coupling ratio to the prescribed value.

12. An optical coupler designed to have a coupling ratio that falls within a desired tolerance of a prescribed value, comprising:

a plurality of waveguides arranged adjacent to one another, and, in a coupling region, situated in sufficient proximity to one another such that optical coupling may occur between waveguides, said optical coupling being defined by an optical coupling ratio deviating from said prescribed value, said waveguides in said coupling region each having a refractive index difference between a core and clading layer modified by irradiation sufficient to cause the optical coupling ratio to shift to a value that falls within the desired tolerance of the prescribed value; wherein the irradiated optical coupler is annealed.

13. The coupler of claim 12 wherein said dose of radiation has an energy that is at least absorbed by the cladding of the waveguides.

14. The coupler of claim 13 wherein said dose of radiation has an energy that is also absorbed by the core of the waveguides.

15. The coupler of claim 12 wherein said dose of energy is substantially absorbed by the core of the waveguides.

16. The coupler of claim 12 wherein said radiation corresponds to ultraviolet radiation.

17. The coupler of claim 16 wherein the cores of said waveguides are composed of phosphorous-doped silica.

18. The coupler of claim 17 further comprising the step of annealing the optical coupler in oxygen prior to the step of applying the dosage of radiation.

19. The coupler of claim 12 wherein the cores of said waveguides are composed of germanium-doped silica.

20. The coupler of claim 19 wherein said radiation has a wavelength of approximately 247 nm.

21. The coupler of claim 12 further comprising the step of annealing the optical coupler subsequent to the step of applying radiation.

22. The coupler of claim 21 wherein said annealing step is performed for a time period sufficient to adjust the optical coupling ratio to the prescribed value.

* * * * *